(12) United States Patent
McLeod et al.

(10) Patent No.: US 12,440,828 B2
(45) Date of Patent: Oct. 14, 2025

(54) CATALYST SUPPORT

(71) Applicant: JOHNSON MATTHEY HYDROGEN TECHNOLOGIES LIMITED, London (GB)

(72) Inventors: Lucy McLeod, Reading (GB); Jonathan Sharman, Reading (GB); Geoffrey Spikes, Reading (GB); Richard Walton, Coventry (GB)

(73) Assignee: Johnson Matthey Hydrogen Technologies Limited, London (GB)

( * ) Notice: Subject to any disclaimer, the term of this patent is extended or adjusted under 35 U.S.C. 154(b) by 528 days.

(21) Appl. No.: 17/758,775

(22) PCT Filed: Mar. 12, 2021

(86) PCT No.: PCT/GB2021/050627
§ 371 (c)(1),
(2) Date: Jul. 13, 2022

(87) PCT Pub. No.: WO2021/181113
PCT Pub. Date: Sep. 16, 2021

(65) Prior Publication Data
US 2023/0045086 A1 Feb. 9, 2023

(30) Foreign Application Priority Data
Mar. 13, 2020 (GB) .................. 2003650

(51) Int. Cl.
*B01J 27/24* (2006.01)
*B01J 35/00* (2024.01)
(Continued)

(52) U.S. Cl.
CPC ............... *B01J 27/24* (2013.01); *B01J 35/33* (2024.01); *H01M 4/8807* (2013.01);
(Continued)

(58) Field of Classification Search
CPC .. B01J 27/20; B01J 27/22; B01J 27/24; C01B 21/0828; H01M 4/9075; H01M 4/925
See application file for complete search history.

(56) References Cited

U.S. PATENT DOCUMENTS 4,333,916 A * 6/1982 Iwai ...................... C04B 35/571
501/87
5,417,952 A * 5/1995 Koc .................... C01B 21/0828
423/440
(Continued)

FOREIGN PATENT DOCUMENTS

CN 104961108 A * 10/2015
CN 104987075 A * 10/2015
(Continued)

OTHER PUBLICATIONS

Machine translation of JP2013116458, pulication date Dec. 5, 2011.*

(Continued)

*Primary Examiner* — Jun Li
(74) *Attorney, Agent, or Firm* — BakerHostetler

(57) ABSTRACT

The present invention provides a metal carbonitride comprising: i) a first metal, $M^1$; and ii) a second metal, $M^2$; wherein $M^1$ is titanium, zirconium or hafnium; and $M^2$ is vanadium, niobium, tantalum, chromium, molybdenum, tungsten, iron, ruthenium or osmium.

14 Claims, 4 Drawing Sheets

(51) Int. Cl.
 *B01J 35/33* (2024.01)
 *H01M 4/88* (2006.01)
 *H01M 4/90* (2006.01)
 *H01M 8/1004* (2016.01)
 *H01M 8/10* (2016.01)

(52) U.S. Cl.
 CPC ....... *H01M 4/8814* (2013.01); *H01M 4/9075* (2013.01); *H01M 8/1004* (2013.01); *H01M 2008/1095* (2013.01)

(56) References Cited

U.S. PATENT DOCUMENTS

| | | | |
|---|---|---|---|
| RE37,307 E | | 8/2001 | Bahar et al. |
| 7,807,063 B2 | | 10/2010 | Liu et al. |
| 7,867,669 B2 | | 1/2011 | Liu et al. |
| 8,007,561 B2 | * | 8/2011 | Shindo ................. C22C 27/04 75/238 |
| 2009/0049953 A1 | | 2/2009 | Shindo et al. |
| 2011/0020729 A1 | | 1/2011 | Monden et al. |
| 2011/0117368 A1 | | 5/2011 | Matsubara et al. |
| 2014/0004440 A1 | * | 1/2014 | Han ................... H01M 4/9083 977/773 |
| 2017/0033367 A1 | * | 2/2017 | Fukuta ................... B01J 35/30 |
| 2020/0340083 A1 | | 10/2020 | Michiuchi et al. |

FOREIGN PATENT DOCUMENTS

| | | | |
|---|---|---|---|
| GB | 2015/050864 A | | 3/2014 |
| JP | 2006346776 A | * | 12/2006 |
| JP | 2007-69310 A | | 3/2007 |
| JP | 5146121 B2 | * | 2/2013 |
| JP | 2013116458 A | * | 6/2013 |
| WO | WO 01/15247 A2 | | 3/2001 |
| WO | 2005/123255 A1 | | 12/2005 |
| WO | 2010/041650 A1 | | 4/2010 |
| WO | WO 2011/021034 A1 | | 2/2011 |
| WO | 2012/080726 A1 | | 6/2012 |
| WO | 2013/045894 A1 | | 4/2013 |
| WO | 2014/184546 A1 | | 11/2014 |
| WO | 2015/145128 A1 | | 10/2015 |
| WO | 2017/203257 A1 | | 11/2017 |
| WO | 2019220533 A1 | | 11/2019 |

OTHER PUBLICATIONS

Machine translation of JP5146121B2, publication date Feb. 20, 2013.*
Ahlen et al., Synthesis and Characterisation of TaxTi1-xC and TaxTi1-xCyN1-y Whiskers, Journal of the European Ceramic Society 18 (1998) 1513-1519.*
Roca-Ayats et al. Titanium carbide and carbonitride electrocatalyst supports: modifying Pt-Ti interface properties by electrochemical potential cycling, J. Mater. Chem. A, 2014, 2, 18786-18790.*
Roca-Ayats, PtSn nanoparticles supported on titanium carbonitride for the ethanol oxidation reaction, Applied Catalysis B: Environmental 237 (2018) 382-391.*
Liang et al., Synthesis of new two-dimensional titanium carbonitride Ti2C0.5N0.5Tx MXene and its performance as an electrode material for sodium-ion battery, InfoMat. 2021;3:1422-1430.*
Avasarala et al., J. Mater. Chem., 2009, 19, 1803-1805.
Cui et al., Chem. Mater., 2013, 25, 3782-3784.
Fontes, et al., Chemical Engineering Journal, 2011, 175, 534-538.
Jin, et al. Scientific Reports, 2014, 4, 1-7.
Kimmel et al., ACS Catal., 2014, 4,1558-1562.
Li et al., ACS Applied Materials & Interfaces, 2018, 10, 38117-38124.
Nam et al., Electrochim. Acta, 2010, 55, 7290-7297.
Ramanathan, et al., J. Phys. Chem., 1995, 99, 16365-16372.
Da Silva, et al., J.Solid State Chemistry, 1996, 123, 168-182.
Stamatin et al., ECS Transactions, 2013, 58, 1267-1276.
Tackett et al., Int. J. Hydrogen Energy, 2016, 41, 5948-5954.
Carlos Alberto Chagas, et al., "Synthesis of Niobium Carbonitride by Thermal Decomposition of Guanidine Oxaloniobate and Its Application to the Hydrodesulfurization of Dibenzothiophene", Topics in Catalysis, Kluwer Academic Publishers-Plenum Publishers, NE, vol. 55, No. 14-15, Aug. 17, 2012 (Aug. 17, 2012), pp. 910-921, XP035115127,ISSN: 1572-9028, Doi: 10.1007/S11244-012-9876-1; Experimental.

* cited by examiner

CATALYST SUPPORT

FIELD OF THE INVENTION

The present invention relates to a mixed metal carbonitride which can be used as a support for an electrocatalyst.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) the ion-conducting membrane is proton conducting, and protons, produced at the anode, are transported across the ion-conducting membrane to the cathode, where they combine with oxygen to form water.

A principal component of the PEMFC is the membrane electrode assembly, which is essentially composed of five layers. The central layer is the polymer ion-conducting membrane. On either face of the ion-conducting membrane there is an electrocatalyst layer, containing an electrocatalyst designed for the specific electrolytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore, the gas diffusion layer must be porous and electrically conducting.

The electrocatalyst layers also generally comprise a proton conducting material, such as a proton conducting polymer, to aid transfer of protons from the anode electrocatalyst to the ion-conducting membrane and/or from the ion-conducting membrane to the cathode electrocatalyst.

Conventionally, the membrane electrode assembly can be constructed by a number of methods. Typically, the methods involve the application of one or both of the electrocatalyst layers to an ion-conducting membrane to form a catalyst coated ion-conducting membrane. Subsequently, a gas diffusion layer is applied to the electrocatalyst layer. Alternatively, an electrocatalyst layer is applied to a gas diffusion layer to form a gas diffusion electrode, which is then combined with the ion-conducting membrane. A membrane electrode assembly can be prepared by a combination of these methods e.g. one electrocatalyst layer is applied to the ion-conducting membrane to form a catalyst coated ion-conducting membrane, and the other electrocatalyst layer is applied as a gas diffusion electrode. The electrocatalyst layers are applied using an electrocatalyst ink which conventionally comprises an electrocatalyst material, an ion-conducting polymer, solvents and/or diluents, and any agents desired to be included in the electrocatalyst layer.

The electrocatalyst layers generally comprise an electrocatalyst material comprising a metal or metal alloy suitable for the fuel oxidation or oxygen reduction reaction, depending on whether the layer is to be used at the anode or cathode. Electrocatalysts for fuel oxidation and oxygen reduction are typically based on platinum or platinum alloyed with one or more other metals. The platinum or platinum alloy electrocatalyst can be in the form of unsupported nanometre sized particles (for example metal blacks) or can be deposited as discrete very high surface area nanoparticles onto an electrically conducting support material (a supported electrocatalyst), such as a high surface area carbon material.

Suitable carbons typically include those from the carbon black family, such as oil furnace blacks, extra-conductive blacks, acetylene blacks and graphitised versions thereof. Exemplary carbons include Akzo Nobel Ketjen® EC300J and Cabot Vulcan® XC72R. Additionally, carbons specifically designed for fuel cell applications such as those described in WO2013/012894 may be used. Alternative materials used as electrically conductive supports include metal oxides or mixed oxides, in particular conductive mixed oxides such as niobia-doped titania, phosphorus-doped tin oxide and mixed platinum group metal oxides or mixed metal oxides as disclosed in WO2012/080726.

Metal carbides, nitride and carbonitride based electrocatalyst support materials have been investigated as potentially stable materials which can be tuned in terms of properties such as conductivity, and catalytic activity. Particular catalyst support systems which have been investigated include platinum on niobium carbide which shows high hydrogen evolution activity and stability in both acidic and alkaline environments.[1] Niobium carbonitride has been investigated as a platinum support for the oxygen reduction reaction in an acidic environment under potential cycling[2][3], as have various transition metal carbides [4]. Also, nanostructured niobium titanium nitrides have been shown as potential durable noncarbon supports for oxygen reduction reaction catalysts[5][6]. Additionally, titanium nitride and titanium carbonitride nanoparticles have been shown to act as electrocatalyst supports for PEMFCs and have shown better activity and/or durability than conventional platinised carbon electrocatalysts in acidic media[7][8].

One of the main issues with use of carbonitride and carbides is the difficulty of synthesis due to the high temperatures and reactive gases required. Traditionally the synthesis involves temperature programmed carburisation of a transition metal oxide using a carburising mixture (e.g. 20 (v/v) % $CH_4/H_2$) and appropriate temperature programming [9,10]. Depending on the final carburisation temperature, the thermal decomposition of methane can occur, leading to the formation of pyrolytic carbon that covers the carbide surface [11]. Niobium carbide cannot be formed below 950° C. via this method [9,10] and such conditions favour formation of samples with low specific areas[12]. Chagas et al. proposed a new method for the synthesis of niobium carbonitride using lower temperatures than traditional methods[11]. This method reacts guanidine carbonate and ammonium niobate (V) oxalate hydrate at 150° C. in air for 12 hours, followed by heating to 400° C. under helium for 4 hours and subsequently at 450-900° C. under helium for 2 hours[11]. However, three separate heating steps are required.

SUMMARY OF THE INVENTION

There is a need in the art for new electrocatalyst supports having good conductivity, acid resilience and electrochemical stability.

Accordingly, in a first aspect the present invention provides a metal carbonitride comprising:
i) a first metal, $M^1$; and
ii) a second metal, $M^2$;
wherein $M^1$ is titanium, zirconium or hafnium; and $M^2$ is vanadium, niobium, tantalum, chromium, molybdenum, tungsten, iron, ruthenium or osmium.

In particular, the metal carbonitride has a composition represented as:

$$M^2{}_xM^1{}_{1-x}C_{1-p}N_p$$

wherein $M^1$ is titanium, zirconium or hafnium; and $M^2$ is vanadium, niobium, tantalum, chromium, molybdenum, tungsten, iron, ruthenium or osmium.

The metal carbonitride of the invention, which comprises:
i) a first metal, $M^1$, wherein $M^1$ is titanium, zirconium or hafnium; and
ii) a second metal, $M^2$, wherein $M^2$ is, vanadium, niobium, tantalum, chromium, molybdenum, tungsten, iron, ruthenium or osmium;
may be prepared by a method comprising the steps of:
a) homogenising a mixture of:
A) a salt of a metal $M^2$;
B) a salt of a metal $M^1$; and
C) a salt of guanidine; and then heating the homogenised mixture to a temperature in the range of and including 100 to 200° C.; then
b) heating the product of step a) to a temperature in the range of and including 500° C. to 1500° C.;
wherein said salts of metals $M^1$ and $M^2$ each contain carbon.

The present invention also provides nanoparticles comprising, preferably consisting essentially of, more preferably consisting of (or comprising only) the metal carbonitride of the invention.

The present invention also provides a catalyst support material comprising, preferably consisting essentially of, more preferably consisting of (or comprising only) the metal carbonitride or the nanoparticle of the invention.

The present invention also provides a catalyst material comprising, preferably consisting essentially of, more preferably consisting of (or comprising only) an electrocatalyst supported on the support material of the invention.

The present invention also provides an electrocatalyst layer comprising the catalyst material of the invention.

The present invention also provides a catalyst coated ion-conducting membrane comprising the catalyst material of the invention or the electrocatalyst layer of the invention.

The present invention also provides a catalysed decal transfer substrate comprising the electrocatalyst layer of the invention and a decal transfer substrate.

The present invention also provides a gas diffusion electrode comprising the electrocatalyst layer of the invention and a gas diffusion layer.

The present invention also provides a membrane electrode assembly comprising the electrocatalyst layer of the invention, the catalyst coated ion-conducting membrane of the invention, or the gas diffusion electrode of the invention.

The present invention also provides a fuel cell comprising the electrocatalyst layer of the invention, the catalyst coated ion-conducting membrane of the invention, the gas diffusion electrode of the invention, or the membrane electrode assembly of the invention.

DETAILED DESCRIPTION OF THE INVENTION

Figure 1:
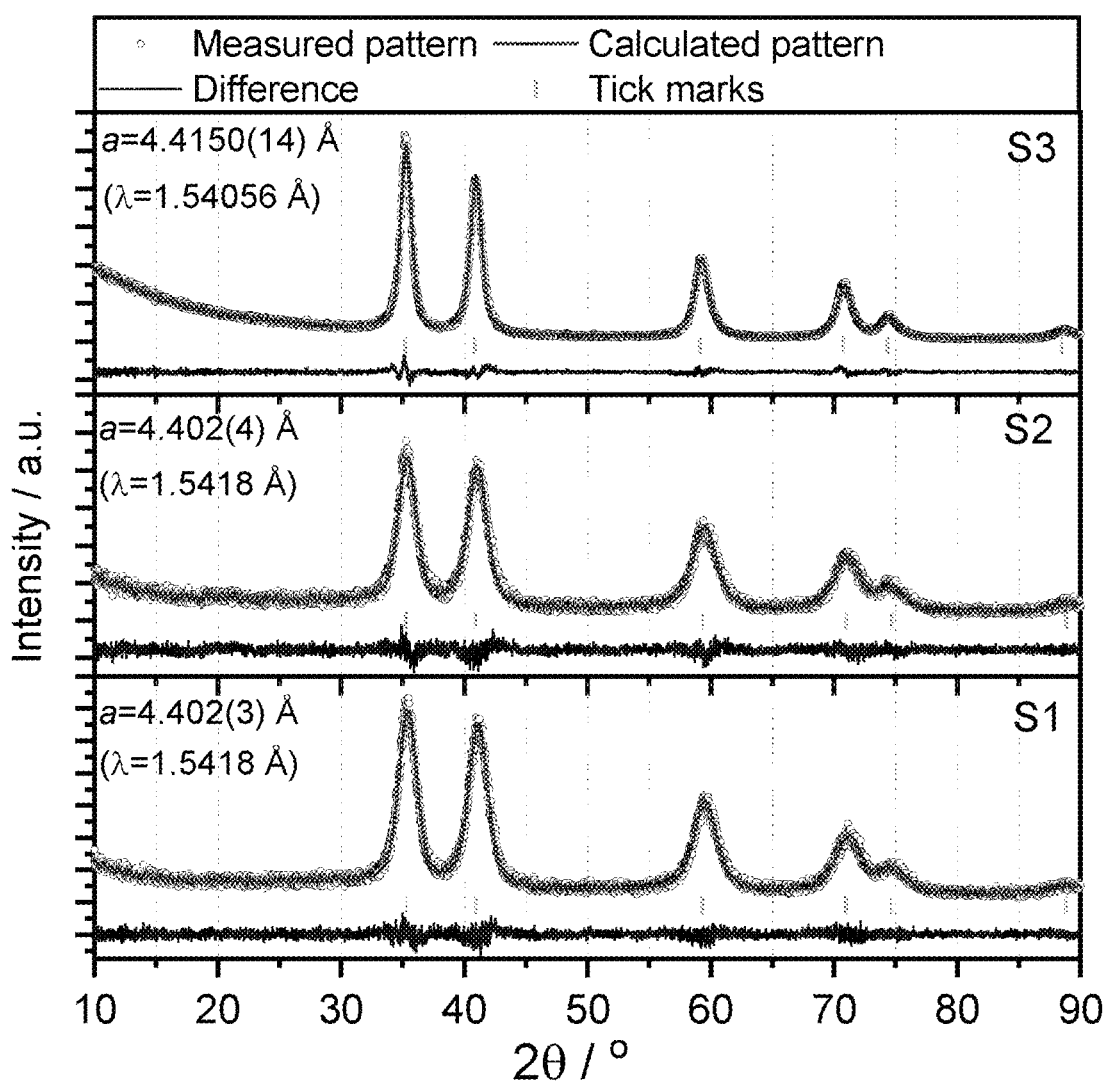
FIG. 1 shows x-ray diffraction patterns for metal carbonitrides of the invention.

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

A metal carbonitride is a compound containing carbon, nitrogen and a metal. In the present invention, two metals $M^1$ and $M^2$ are present in addition to carbon and nitrogen. The skilled person is aware that the existence of a metal carbonitride can be identified by, for example, a single phase in an x-ray diffraction pattern and data showing that carbon, nitrogen and metal are distributed throughout the material. For example, transmission electron microscopy (TEM) images of the material with elemental mapping. When the metal carbonitride of the invention is represented by the formula $M^2{}_xM^1{}_{1-x}C_{1-p}N_p$, x is in the range of and including 0.05 to 0.95, preferably 0.05 to 0.7, most preferably 0.05 to 0.55. x may also be in the range of and including 0.05 to 0.3. When the metal carbonitride of the invention is represented by the formula $M^2{}_xM^1{}_{1-x}C_{1-p}N_p$. p may be in the range of and including 0.1 to 0.7, preferably 0.1 to 0.6, more preferably 0.1 to 0.5. p may also be in the range of and including 0.3 to 0.6.

$M^1$ is titanium, zirconium or hafnium, preferably titanium. $M^2$ is vanadium, niobium, tantalum, chromium, molybdenum, tungsten, iron, ruthenium or osmium, suitably $M^2$ is vanadium, niobium, tantalum, chromium, molybdenum, tungsten or iron, preferably $M^2$ is vanadium, niobium, tantalum, chromium, molybdenum or tungsten, more preferably $M^2$ is vanadium, niobium or tantalum, most preferably $M^2$ is vanadium or niobium, in particular niobium. Accordingly, the most preferred metal carbonitrides represented by the formula $M^2{}_xM^1{}_{1-x}C_{1-p}N_p$ are $Nb_xTi_{1-x}C_{1-p}N_p$ and $Ta_xTi_{1-x}C_{1-p}N_p$.

The powder conductivity of the metal carbonitride is suitably at least 0.5 S cm$^{-1}$, preferably at least 1.0 S cm$^{-1}$. The maximum powder conductivity is not limited and could be, for example, equal to the conductivity of graphite. To measure powder conductivity, powder samples were added to a cylinder and compressed using a piston between two gold plated electrode plates (1 cm$^2$, one on the piston and one at the bottom of the cylinder) at 2 bar pressure under inert gas. The thickness of the resulting pellets was measured, and the conductivity derived from the resistivity measured from the slope of change in voltage with applied current using an Autolab potentiostat.

In step a) of the method of preparing the metal carbonitride of the invention, the mixture of reagents A), B) and C), preferably all in powder form, is homogenised. Preferably, the mixture is ground together to give a homogenised mixture, preferably a powder. For example, the reagents may be ground together with a pestle and mortar for a period of up to, for example five minutes. Other methods of homogenising the mixture will be known to a skilled person. The heating in step a) is suitably carried out such that the temperature in the range of and including 100° C. to 200° C. is maintained for a period of time in the range of and including 5 to 20 hours. The step is preferably carried out in air, for example in an oven.

In between steps a) and b), the product of step a) is suitably allowed to cool to room temperature (e.g. 20 to 25° C.).

In step b) of the method, the product of step a) is heated to a temperature in the range of and including 500° C. to 1500° C., suitably 500 to 1300° C., preferably 500 to 1000° C., most preferably 700 to 1000° C., for example 850 to 950° C. Step b) is suitably carried out such that the required temperature is maintained for a period of time in the range of and including 1 to 24 hours, preferably 1 to 12 hours, most preferably 1 to 5 hours, for example 3 to 5 hours. The step is preferably carried out in an inert atmosphere, for example an atmosphere of predominantly argon, helium or nitrogen, e.g. greater than 99% by weight argon, helium or nitrogen. The step may, for example, be carried out by heating the material in a tube furnace under a flow of the inert gas. Suitably, there is a step of cooling the material to room temperature after the heating step for example at a rate of at least 10° C. per minute and no more than 50° C. per minute, preferably no more than 30° C. per minute. Once cooled, the surface of the material may be passivated, for example by allowing air into the heating apparatus gradually, for example over a period of time of greater than two hours, preferably greater than five hours, suitably no more than ten hours. Air can be let into the apparatus gradually by, for example, gradually loosening any gas tight seals on the heating apparatus before stopping the flow of inert gas into the apparatus.

In the method, the molar ratio of reagent A) to reagent B) corresponds to the stoichiometric ratio of $M^2$ to $M^1$ in the product material, e.g. the value of x in $M^2_xM^1_{1-x}C_{1-p}N_p$. Accordingly, the molar ratio of A) to B) may be in the range of and including 0.05:0.95 to 0.95:0.05, preferably 0.05:0.95 to 0.7:0.3, most preferably 0.05:0.95 to 0.55:0.45. The molar ratio of A) to B) may also be in the range of and including 0.05:0.95 to 0.3:0.7.

In the method, reagent A) is a salt of metal $M^2$, and reagent B) is a salt of metal $M^1$. Each of reagents A) and B) contain carbon, and each of reagents A) and B) may also, independently, contain nitrogen. Accordingly, reagent A) may contain carbon and nitrogen, or reagent B) may contain carbon and nitrogen, or both reagents A) and B) may contain carbon and nitrogen. Preferably, both reagents A) and B) contain carbon and nitrogen. The molar amounts of carbon and, if present, nitrogen in these reagents, as well as reagent C), determine the stoichiometric ratio of carbon and nitrogen in the product metal carbonitride as well as the ratio of total carbon and nitrogen to total metal. Some carbon and nitrogen will be lost during the reaction and, as discussed below, amorphous carbon may be formed during the method. It is within the capability of a skilled person take these effects into account.

Preferably, reagents A) and B) are salts of the metal (i.e. $M^2$ or $M^1$) comprising an oxygen containing organic ligand. If the reagent contains nitrogen, then the salt is preferably a salt of ammonia or an amine, the salt comprising an oxygen containing organic ligand. As a skilled person will understand, ammonia provides nitrogen to the product, the amine provides nitrogen and carbon, and the oxygen containing organic ligand provides carbon. Accordingly, the structure of the amine will depend on the desired amount of carbon present in the product metal carbonitride. The oxygen containing ligand may be a bidentate oxygen containing ligand, preferably a 1,2-oxygen substituted organic ligand (e.g. an organic ligand in which two directly neighbouring carbons bear an oxygen moiety), for example an oxalate, or 1,2-dihydroxybenzene or derivative thereof. A derivative in this context is a 1,2-dihydroxybenzene moiety substituted on at least one carbon atom with further carbon containing groups. The structure of the derivative, i.e. the carbon substitution pattern, will depend on the desired amount of carbon present in the product metal carbonitride. The salts are preferably hydrated, and the amount of water present can be determined by thermogravimetric analysis. Suitable regents A), when $M^2$ is niobium or tantalum, include niobium hydrogen oxalate, niobium oxalate, ammonium niobate (V) oxalate hydrate $((NH_4NbO(C_2O_4)_2.xH_2O)$, tantalum hydrogen oxalate, tantalum oxalate and ammonium tantalate (V) oxalate hydrate $((NH_4TaO(C_2O_4)_2.xH_2O)$. Suitable reagents B), when $M^1$ is titanium, include potassium titanyl oxalate, titanium oxalate and ammonium titanyl oxalate monohydrate $((NH_4)_2TiO(C_2O_4)_2.H_2O)$. Preferred reagents A) include ammonium niobate (V) oxalate hydrate $((NH_4NbO(C_2O_4)_2.xH_2O)$ or ammonium tantalate (V) oxalate hydrate $((NH_4TaO(C_2O_4)_2.xH_2O)$, and preferred reagents (B) include ammonium titanyl oxalate monohydrate $((NH_4)_2TiO(C_2O_4)_2.H_2O)$. Reagent C) is a salt of guanidine, preferably guanidine carbonate.

The method may result in the formation of amorphous carbon such that the direct product is the metal carbonitride of the invention and, for example, up to 20 wt % amorphous carbon by total weight of the material. A skilled person will be aware of ways in which the amorphous carbon can be removed, an example being heating the material in a hydrogen atmosphere to functionalise the carbon and disperse the product of functionalisation, e.g. light hydrocarbons such a methane.

The nanoparticles of the invention may have a mean particle size of 500 nm or less, suitable 250 nm or less, preferably 100 nm or less, for example 50 nm or less. Typically, the nanoparticles have a mean particle size of no less than 5 nm. The size of the nanoparticles will depend on the temperature used to prepare the nanoparticles, e.g. the temperature used in step b) of the method of preparing the metal carbonitride of the invention. The higher the temperature used, the larger the size of the particles. The nanoparticles may form agglomerates, which comprise loosely held individual support particles or aggregates held together by weak forces. Agglomerates can be readily broken down into the individual support particles or aggregates under imposition of low energy agitation. Aggregates are particles that have associated into a cluster composed of two or more primary particles which are permanently bound to each other; the total specific surface area of the aggregate is less than the sum of the surface areas of the primary particles before they were aggregated.

The metal carbonitride of the invention is useful as a support for electrocatalysts, in particular in a fuel cell or electrolyser, in particular a proton exchange membrane fuel cell or electrolyser. The use of the metal carbonitride is not limited to these applications though. As a skilled person will understand, the metal carbonitride may be used as a support for an electrocatalyst in any application, especially applications which require good conductivity, acid residence and electrochemical stability. Accordingly, the present invention provides a catalyst support material comprising, preferably consisting essentially of, more preferably consisting of (or comprising only) the metal carbonitride or the nanoparticle of the invention. Additionally, the present invention provides a catalyst material comprising, preferably consisting essentially of, more preferably consisting of (or comprising only) an electrocatalyst supported on the support material of the invention. The term "supported" will be readily understood by a skilled person. For example, it will be understood that the term "supported" includes the electrocatalyst being dispersed on the support material and bound or fixed to the support material by physical or chemical bonds. For instance, the electrocatalyst may be bound or fixed to the support material by way of ionic or covalent bonds, or non-specific interactions such as van der Waals forces.

The electrocatalyst may suitably be selected from:
(i) the platinum group metals (platinum, palladium, rhodium, ruthenium, iridium and osmium);
(ii) gold or silver;
(iii) a base metal;
or an alloy or mixture comprising one or more of these metals or their oxides. A base metal is tin or a transition metal which is not a noble metal. A noble metal is a platinum group metal (platinum, palladium, rhodium, ruthenium, iridium or osmium) or gold. Preferred base metals are copper, cobalt, nickel, zinc, iron, titanium, molybdenum, vanadium, manganese, niobium, tantalum, chromium and tin.

The electrocatalyst is preferably suitable for use in a fuel cell or electrolyser, more preferably a proton exchange membrane fuel cell or electrolyser. For example, the electrocatalyst may catalyse the oxygen reduction reaction (e.g. in a proton exchange membrane fuel cell cathode), the oxygen evolution reaction (e.g. in a proton exchange membrane electrolyser anode), the hydrogen oxidation reaction (e.g. in a proton exchange membrane fuel cell anode) or the hydrogen evolution reaction (e.g. in a proton exchange membrane electrolyser anode). Typically, the electrocatalyst comprises a platinum group metal, preferably platinum or iridium, or an alloy of a platinum group metal, preferably of platinum or iridium. Suitable alloys include alloys of platinum group metals, preferably of platinum or iridium, with a base metal (preferred base metals as defined above), preferably nickel or cobalt, most preferably nickel. The atomic ratio of platinum group metal to alloying metal is typically in the range of and including 3:1 to 1:3.

The electrocatalyst may be an oxygen evolution reaction catalyst suitable for use, for example, in the anode or cathode of a proton exchange membrane fuel cell along with the hydrogen oxidation or oxygen reduction reaction electrocatalyst. As is known to a skilled person, such oxygen evolution reaction catalysts can mitigate against real-world operational situations such as cell reversal (i.e. such electrocatalysts contribute to cell reversal tolerance) as discussed in, for example, WO01/15247. The oxygen evolution reaction catalyst suitably does not comprise platinum. The oxygen evolution reaction catalyst may comprise ruthenium or ruthenium oxide or iridium or iridium oxide or mixtures thereof. The oxygen evolution reaction catalyst may comprise iridium or iridium oxide and one or more metals $M^3$ or an oxide thereof wherein $M^3$ is a transition metal (other than iridium or ruthenium) or tin.

$M^3$ may be a Group 4 metal: titanium, zirconium or hafnium.

$M^3$ may be a Group 5 metal: vanadium, niobium or tantalum $M^3$ may be a Group 6 metal: chromium, molybdenum or tungsten.

$M^3$ may be tin.

$M^3$ may be selected from the group consisting of tantalum, titanium, zirconium, hafnium, niobium and tin; preferably tantalum, titanium and tin. The iridium or oxide thereof and the one or more metals (M) or oxide thereof may either exist as mixed metals or oxides or as partly or wholly alloyed materials or as a combination thereof. The extent of any alloying can be shown by x-ray diffraction (XRD). The atomic ratio of iridium to (total) metal M in the oxygen evolution catalyst is from 20:80 to 99:1, suitably 30:70 to 99:1 and preferably 60:40 to 99:1. Such oxygen evolution catalysts may be made by methods known to those in the art, for example by wet chemical methods. For example, the oxygen evolution reaction catalyst may be mixed oxide, such as a mixed iridium tantalum oxide as disclosed in WO 2011/021034.

The oxygen evolution reaction suitable for use, for example, in the anode or cathode of a proton exchange membrane fuel cell along with the hydrogen oxidation or oxygen reduction reaction electrocatalyst may comprise a mixed metal oxide of formula

wherein A and A' are the same or different and are selected from the group consisting of yttrium, lanthanum, cerium, praseodymium, neodymium, promethium, samarium, europium, gadolinium, terbium, dysprosium, holmium, erbium, thulium, ytterbium, lutetium, magnesium, calcium, strontium, barium, sodium, potassium, indium, thallium, tin, lead, antimony and bismuth; B is selected from the group consisting of Ru, Ir, Os, and Rh; B' is selected from the group consisting of Ru, Ir, Os, Rh, Ca, Mg or RE (wherein RE is a rare earth metal); c is from 3-11; the atomic ratio of (a+b):c is from 1:1 to 1:2; the atomic ratio of a:b is from 1:1.5 to 1.5:1. A and A' may be selected from the group consisting of: sodium, potassium, calcium, strontium, barium, lead and cerium. B may selected from the group consisting of Ru, Ir, Os, Rh (suitably Ru and Ir) having an oxidation state of from $3^+$ to $6^+$, including intermediate partial oxidation states. B' may be selected from the group consisting of Ru, Ir, Os, Rh (suitably Ru and Ir) having an oxidation state of from $3^+$ to $6^+$, including intermediate partial oxidation states, Ca, Mg, RE (wherein RE is as hereinafter defined), indium, thallium, tin, lead, antimony and bismuth. c is from 3-11. Since the atomic ratio of (a+b):c is known, the value of (a+b) can be determined. Similarly, since the atomic ratio of a:b and the value of (a+b) is known, the values of a and b can be determined. Specific examples of crystalline metal oxides which may be used as the oxygen evolution catalyst include, but are not limited to: $RERuO_3$; $SrRuO_3$; $PbRuO_3$; $REIrO_3$; $CaIrO_3$; $BaIrO_3$; $PbIrO_3$; $SrIrO_3$; $KIrO_3$; $SrM_{0.5}Ir_{0.5}O_3$; $Ba_3LiIr_2O_9$; $Sm_2NaIrO_6$; $La_{1.2}Sr_{2.7}IrO_{7.33}$; $Sr_3Ir_2O_7$; $Sr_2Ir_3O_9$; $SrIr_2O_6$; $Ba_2Ir_3O_9$; $BaIr_2O_6$; $La_3Ir_3O_{11}$; $RE_2Ru_2O_7$; $RE_2Ir_2O_7$; $Bi_2Ir_2O_7$; $Pb_2Ir_2O_7$; $Ca_2Ir_2O_7$; $(NaCa)_2Ir_2O_6$; $(NaSr)_3Ir_3O_{11}$; $(NaCe)_2Ir_2O_7$; $(NaCe)_2Ru_2O_7$; $(NaCe)_2(RuIr)_2O_7$. In the above specific examples: RE is one or more rare earth metals selected from the group consisting of: yttrium, lanthanum, cerium, praseodymium, neodymium, promethium, samarium, europium, gadolinium, terbium, dysprosium, holmium, erbium, thulium, ytterbium, lutetium; M is Ca, Mg or RE (where RE is as defined before). These crystalline mixed metal oxides may be prepared by methods known in the art, such as described in WO2012/080726.

The catalyst material of the invention may be prepared by any process known to those skilled in the art for depositing an electrocatalyst on a support material including those discussed in WO 2017/203257. For example, the electrocatalyst may be deposited from a solution containing a metal precursor (e.g. a salt), as disclosed in WO2013/045894. The electrocatalyst may also be deposited using pre-formed metal or metal oxide nanoparticles suspended in a liquid (i.e. a sol), for example using a procedure analogous to that described in WO2005/123255. Alternatively, a polyol type method may be used, in which the electrocatalyst is deposited from a slurry of a corresponding acid of the electrocatalyst in a polyol, e.g. ethylene glycol. In the case of an alloy electrocatalyst, which can be prepared in conventional fashion, for example, as disclosed in WO2014/184546, a step of acid washing may be carried out to remove any excess/unalloyed alloying metal. Examples of acid washing are known in the art, for example treatment with 0.5M sulphuric acid for up to 24 hours. In addition, or alternatively, in particular in the case of an alloy of a platinum group metal with a base metal, the acid washing step removes a portion of the alloying metal from the surface of the alloy to leave the surface of the electrocatalyst rich in the active metal (a so called "de-alloyed" particle, as discussed in, for example, WO2014/184546).

The electrocatalyst layer of the invention may be a cathode or an anode, preferably of a fuel cell or electrolyser, preferably a proton exchange membrane fuel cell or electrolyser. The characteristics of the electrocatalyst layer, such as the thickness, electrocatalyst loading, porosity, pore size distribution, average pore size and hydrophobicity will depend on whether it is being used at the anode or cathode. For example, in a proton exchange membrane fuel cell anode, the electrocatalyst layer thickness is suitably at least 1 µm, typically at least 5 µm. In such an anode, the electrocatalyst layer thickness is suitably no more than 15 µm, typically no more than 10 µm. In a proton exchange membrane fuel cell a cathode, the electrocatalyst layer thickness is suitably at least 2 µm, typically at least 5 µm. In such a cathode, the electrocatalyst layer thickness is suitably no more than 20 µm, typically no more than 15 µm.

The electrocatalyst loading in the electrocatalyst layer will also depend on the intended use. In this context, electrocatalyst loading means the amount of active metal for the desired reaction (e.g. the active metal for the oxygen reduction reaction in a proton exchange membrane fuel cell cathode), for example platinum group metal, in the electrocatalyst layer. So, when the electrocatalyst is an alloy of platinum, the electrocatalyst loading is the amount of platinum per unit area expressed as $mg/cm^2$. In a fuel cell cathode using a platinum electrocatalyst, the electrocatalyst loading is suitably at least 0.05 $mgPt/cm^2$, for example no more than 0.7 $mgPt/cm^2$, preferably no more than 0.3 $mgPt/cm^2$. In a fuel cell anode, the loading of platinum in the electrocatalyst layer is suitably at least 0.02 $mgPt/cm^2$, for example no more than 0.2 $mg/Ptcm^2$, preferably no more than 0.15 $mgPt/cm^2$.

The electrocatalyst layer of the invention preferably comprises an ion-conducting polymer, such as a proton conducting polymer, to improve the ion-conductivity of the layer. Accordingly, the ion-conducting material may include ionomers such as perfluorosulphonic acid materials (e.g. Nafion® (Chemours Company), Aciplex® (Asahi Kasei), Aquivion® (Solvay Specialty Polymer), Flemion® (Asahi Glass Co.) and perfluorosulphonic acid ionomer material supplied by 3M®), or ionomers based on partially fluorinated or non-fluorinated hydrocarbons that are sulphonated or phosphonated polymers, such as those available from FuMA-Tech GmbH as the Fumapem® P, E or K series of products, or from JSR Corporation, Toyobo Corporation, and others. Suitably, the ionomer is a perfluorosulphonic acid, in particular the Nafion® range available from Chemours company, especially Nafion® 1100EW, the Aquivion® range available from Solvay, especially Solvay® 830EW, and 3M 825EW perfluorosulphonic acid ionomer.

The electrocatalyst layer may comprise additional components. For example, a proton exchange membrane fuel cell electrocatalyst layer of the invention may comprise the oxygen evolution reaction catalyst discussed above for use in the anode or cathode of a proton exchange membrane fuel cell, along with the hydrogen oxidation (anode) or oxygen reduction reaction (cathode) electrocatalyst. Such additional components may also include, but are not limited to: a hydrogen peroxide decomposition catalyst; a hydrophobic additive (e.g. a polymer such as polytetrafluoroethylene (PTFE) or an inorganic solid with or without surface treatment) or a hydrophilic additive (e.g. a polymer of an inorganic solid, such as an oxide) to control reactant and water transport characteristics. The choice of additional components is within the capability of a skilled person to determine depending on the application of the electrocatalyst layer.

To prepare the electrocatalyst layer, the catalyst material of the invention and any additional components are dispersed in an aqueous and/or organic solvent to prepare a catalyst ink. If required, particle break-up is carried out by methods known in the art, such as high shear mixing, milling, ball milling, passing through a microfluidiser etc. or a combination thereof, to achieve a suitable particle size distribution. After preparation of the catalyst ink, the ink is deposited onto a substrate (e.g. gas diffusion layer, ion-conducting membrane or a carrier/transfer substrate) to form the electrocatalyst layer. The ink may be deposited by any suitable technique known to those in the art, including but not limited to gravure coating, slot die (slot, extrusion) coating, screen printing, rotary screen printing, inkjet printing, spraying, painting, bar coating, pad coating, gap coating techniques such as knife or doctor blade over roll, and metering rod application.

The electrocatalyst layer may be deposited onto a gas diffusion layer to form a gas diffusion electrode of the invention. The gas diffusion layer comprises a gas diffusion substrate and, preferably, a microporous layer. When a microporous layer is present, the electrocatalyst layer is deposited onto the microporous layer. Typical gas diffusion substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc.), or woven carbon cloths. The carbon paper, web or cloth may be provided with a pre-treatment prior to fabrication of the electrode and being incorporated into a membrane electrode assembly either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the softening point of the polymer. Typical microporous layers comprise a mixture of a carbon black and a polymer such as polytetrafluoroethylene (PTFE).

In the catalyst coated ion-conducting membrane of the invention, the electrocatalyst layer is deposited onto an ion-conducting membrane, either by direct coating of a catalyst ink onto the membrane, or indirectly by transfer from a decal transfer substrate, to form a catalyst coated ion-conducting membrane. The catalyst coated ion-conducting membrane of the invention may comprise a second electrocatalyst layer on its opposite face, which may be in accordance with the invention or otherwise. The ion-conducting membrane may suitably be any membrane suitable for use in a proton exchange membrane fuel cell, for example the membrane may be based on a perfluorinated sulphonic acid material such as Nafion™ (Chemours Company), Aquivion® (Solvay Specialty Polymers), Flemion® (Asahi Glass Group) and Aciplex™ (Asahi Kasei Chemicals Corp.) and perfluorosulphonic acid ionomer material supplied by 3M®. Alternatively, the membrane may be based on a sulphonated hydrocarbon membrane such as those available from FuMA-Tech GmbH as the Fumapem® P, E or K series of products, or from JSR Corporation, Toyobo Corporation, and others.

The thickness of the ion-conducting membrane is not particularly limited and will depend on the intended application of the ion-conducting membrane. For example, typical fuel cell ion-conducting membranes have a thickness of at least 5 µm, suitably at least 8 µm, preferably at least 10 µm. Typical fuel cell ion-conducting membranes have a thickness of no more than 50 µm, suitably no more than 30 µm, preferably no more than 20 µm. Accordingly, typical fuel cell ion-conducting membranes have a thickness in the range of and including 5 to 50 µm, suitably 8 to 30 µm, preferably 10 to 20 µm.

The ion-conducting membrane may comprise additional components such as peroxide decomposition catalysts and/or radical decomposition catalysts, and/or recombination catalysts. Recombination catalysts catalyse the recombination of unreacted $H_2$ and $O_2$ which can diffuse into the ion-conducting membrane from the anode and cathode of a fuel cell respectively, to produce water. The ion-conducting membrane may also comprise a reinforcement material, such as a planar porous material (for example expanded polytetrafluoroethylene (ePTFE) as described in USRE37307), embedded within the thickness of the ion-conducting membrane, to provide for improved mechanical strength of the ion-conducting membrane, such as increased tear resistance and reduced dimensional change on hydration and dehydration, and thus further increase the durability of a membrane electrode assembly and lifetime of a fuel cell incorporating the catalysed ion-conducting membrane of the invention. Other approaches for forming reinforced ion-conducting membranes include those disclosed in U.S. Pat. Nos. 7,807,063 and 7,867,669 in which the reinforcement is a rigid polymer film, such as polyimide, into which a number of pores are formed and then subsequently filled with the PFSA ionomer. The choice of additional components is within the capability of a skilled person to determine depending on the application of the electrocatalyst layer.

Any reinforcement present may extend across the entire thickness of the ion-conducting membrane or may extend across only a part of the thickness of the ion-conducting membrane. It will be understood that the thickness of the ion-conducting membrane extends perpendicular to the face of the ion-conducting membrane, e.g. it is in the through plane z-direction. It may further be advantageous to reinforce the perimeter of the first and second surface of the ion-conducting membrane to a greater extent than the central face of the first and second surface of the ion-conducting membrane. Conversely, it may be desirable to reinforce the centre of the first or second surface of the ion-conducting membrane to a greater extent than perimeter of the first or second surface of the ion-conducting membrane.

When the electrocatalyst layer is created on a decal transfer substrate, by coating of a catalyst ink onto the decal transfer substrate, it forms a catalysed decal transfer substrate of the invention. Additional layers may be deposited on the exposed face of the electrocatalyst layer prior to removal of the decal transfer substrate; for example, an ion-conducting ionomer layer may be applied from a dispersion of ionomer using any suitable deposition technique known as described above in relation to deposition of the electrocatalyst layer. Further additional layers can be added as required, for example as described in PCT Patent Application No. GB2015/050864. The decal transfer substrate is removed from the electrocatalyst layer at an appropriate time. The decal transfer substrate may be formed from any suitable material from which the electrocatalyst layer can be removed without damage. Examples of suitable materials include a fluoropolymer, such as polytetrafluoroethylene (PTFE), ethylene tetrafluoroethylene (ETFE), perfluoroalkoxy polymer (PFA), fluorinated ethylene propylene (FEP—a copolymer of hexafluoropropylene and tetrafluoroethylene) and polyolefins, such as biaxially oriented polypropylene (BOPP).

As a skilled person will understand, the membrane electrode assembly of the invention can be constructed by a number of methods, providing it contains at least one electrocatalyst layer of the invention. For example, the membrane electrode assembly may comprise a catalyst coated ion-conducting membrane of the invention which comprises two electrocatalyst layers at least one of which is an electrocatalyst layer of the invention, with a gas diffusion layer applied to each electrocatalyst layer. Alternatively, the membrane electrode assembly may comprise an ion-conducting membrane sandwiched between two gas diffusion electrodes, at least one of which is a gas diffusion electrode of the invention. The membrane electrode assembly may also comprise a catalyst coated ion-conducting membrane with one electrocatalyst layer, and on the opposite face of the ion-conducting membrane a gas diffusion electrode in which either or both of the electrocatalyst layer and the gas diffusion electrode are of the invention.

EXAMPLES

Synthesis of Support Materials

S1 is $Nb_{0.5}Ti_{0.5}C_{1-p}N_p$ in which step b) of the method was conducted at 900° C. for 4 hours.

S2 is $Nb_{0.5}Ti_{0.5}C_{1-p}N_p$ in which step b) of the method was conducted at 900° C. for 12 hours.

S3 is $Nb_{0.5}Ti_{0.5}C_{1-p}N_p$ in which step b) of the method was conducted at 1200° C. for 12 hours.

In a step a) of the method, a metal carbonitride having a composition represented as $Nb_{0.5}Ti_{0.5}C_{1-p}N_p$ was prepared by mixing A) ammonium niobate (V) oxalate hydrate $((NH_4NbO(C_2O_4)_2 \cdot xH_2O)$, B) ammonium titanyl oxalate monohydrate $((NH_4)_2TiO(C_2O_4)_2 \cdot H_2O)$, and C) guanidine carbonate (6.4 g) in a 1:1:4 molar ratio of A):B):C). The mixture was homogenised by grinding in a pestle and mortar for 5 minutes. Thermogravimetric analysis was used to calculate the hydration of the ammonium niobate oxalate hydrate to ensure the correct molar ratio was achieved. The homogenised mixture was then heated in an oven at 150° C. in air for 12 hours before being allowed to cool to room temperature.

In a step b) of the method, the product from step a) was then heated in a tube furnace under a flow of nitrogen to 900° C. for 4 hrs (S1), 900° C. for 12 hrs (S2) or 1200° C. for 4 hrs (S3). The samples were then cooled at a rate of 20° C./min, once cooled the gas tight seals were loosened slowly over the course of several hours before the nitrogen gas was switched off and left for a further hour. This was done in order to passivate the surface of the materials using oxygen from the air.

Synthesis of Catalyst Materials

Support materials S1, S2 and S3 where loaded with iridium as a water electrolysis (oxygen evolution) catalyst to provide catalyst materials E1, E2 and E3 respectively, each containing 30 wt % (by total weight of the catalyst material) iridium.

The support materials were loaded with iridium by a polyol method. 0.5 g of support material was slurried in 100 ml of ethylene glycol with 0.5 g NaOH. Iridium was added in the form of 0.5 g of chloroiridic acid to give 30 wt % iridium in the resulting catalyst material. The slurry was heated to 160° C. and stirred for 2 hours. After cooling, 1 M $H_2SO_4$ was used to dilute the solution to reach a pH of 2. This was then filtered and washed 3 times with 100 ml of deionised water, and the solid material was then dried at 80° C.

Characterisation

The ratio of niobium to titanium in the support materials was controlled by the molar ratio of reagents A) to B) in the synthesis, and could be confirmed by energy dispersive X-ray (EDX) analysis data collected using a Zeiss SUPRA 55VP FEGSEM scanning electron microscope (SEM).

The ratio of carbon to nitrogen in the sample, i.e. the value of "p", was determined using a combination of thermogravimetric analysis (TGA) and CHN analysis.

Specifically, thermogravimetric analysis (TGA) was used to observe the decomposition of the metal carbonitrides in air to their corresponding metal oxides. This information about the mass change combined with CHN analysis was used to calculate the amount of amorphous carbon present in a sample. TGA was used to calculate how much metal was present at room temperature by assuming all the metal carbonitride oxidises by 900° C. to the metal oxides, $TiO_2$ and $Nb_2O_5$, which was confirmed by x-ray diffraction (XRD). The CHN analysis was used assuming that all the nitrogen present is within the carbonitride structure, and the remaining sites are carbon. Table 1 shows the results of TGA and CHN analysis performed on support materials S1 and S2.

TABLE 1

| Material | Metal | Carbon | Nitrogen | Amorphous carbon/wt % |
|---|---|---|---|---|
| S1 | 1 | 0.54 | 0.46 | 14.8 |
| S2 | 1 | 0.54 | 0.46 | 14.3 |

CHN analysis was performed by combustion analysis on an elemental analyser. The original analytical method is based on the complete and instantaneous oxidation of the sample by dynamic flash combustion which converts all organic and inorganic substances into combustion products. The resulting combustion gases pass through a reduction furnace and are swept into the chromatographic column by the He carrier gas. Here they are separated and eluted as nitrogen, carbon dioxide, water and sulfur dioxide, and detected by a thermal conductivity detector which gives an output signal proportional to the concentration of the individual components of the mixture. The instrument is calibrated with the analysis of known standard compounds.

The structures of the support materials and their characterisation as carbonitrides comprising niobium and titanium were confirmed by X-ray diffraction and transmission electron microscopy (TEM) elemental mapping. FIG. 1 shows x-ray diffraction patterns for support materials S1, S2 and S3. It can be seen that a single metal carbonitride phase is present. XRD data were collected at higher resolution using a Panalytical X'Pert Pro MPD, equipped with a monochromatic Cu $K\alpha_1$ radiation ($\lambda=1.54056$ Å) and a PIXcel solid state detector. For the refinement of the unit cell of a material from powder XRD, Pawley refinements were performed using TOPAS software implemented with jedit. The Pawley method involves a least squares analysis of a powder diffraction pattern, where the variables are peak position parameters, peak shape parameters and peak areas. This means no structural model is required.

Figure 2:
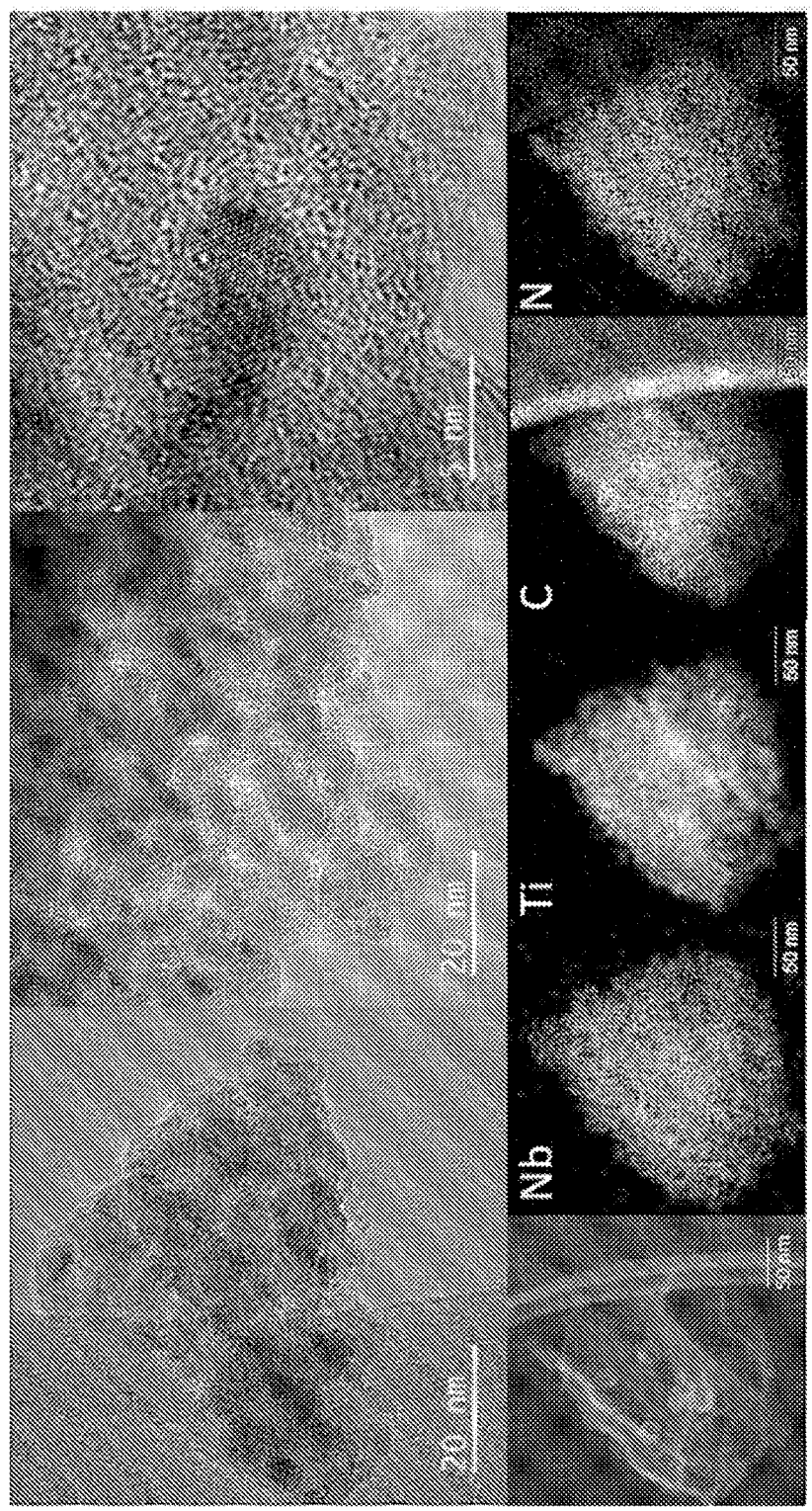
FIG. 2 shows transmission electron microscopy (TEM) images and elemental mapping for a metal carbonitride of the invention.
Figure 3:
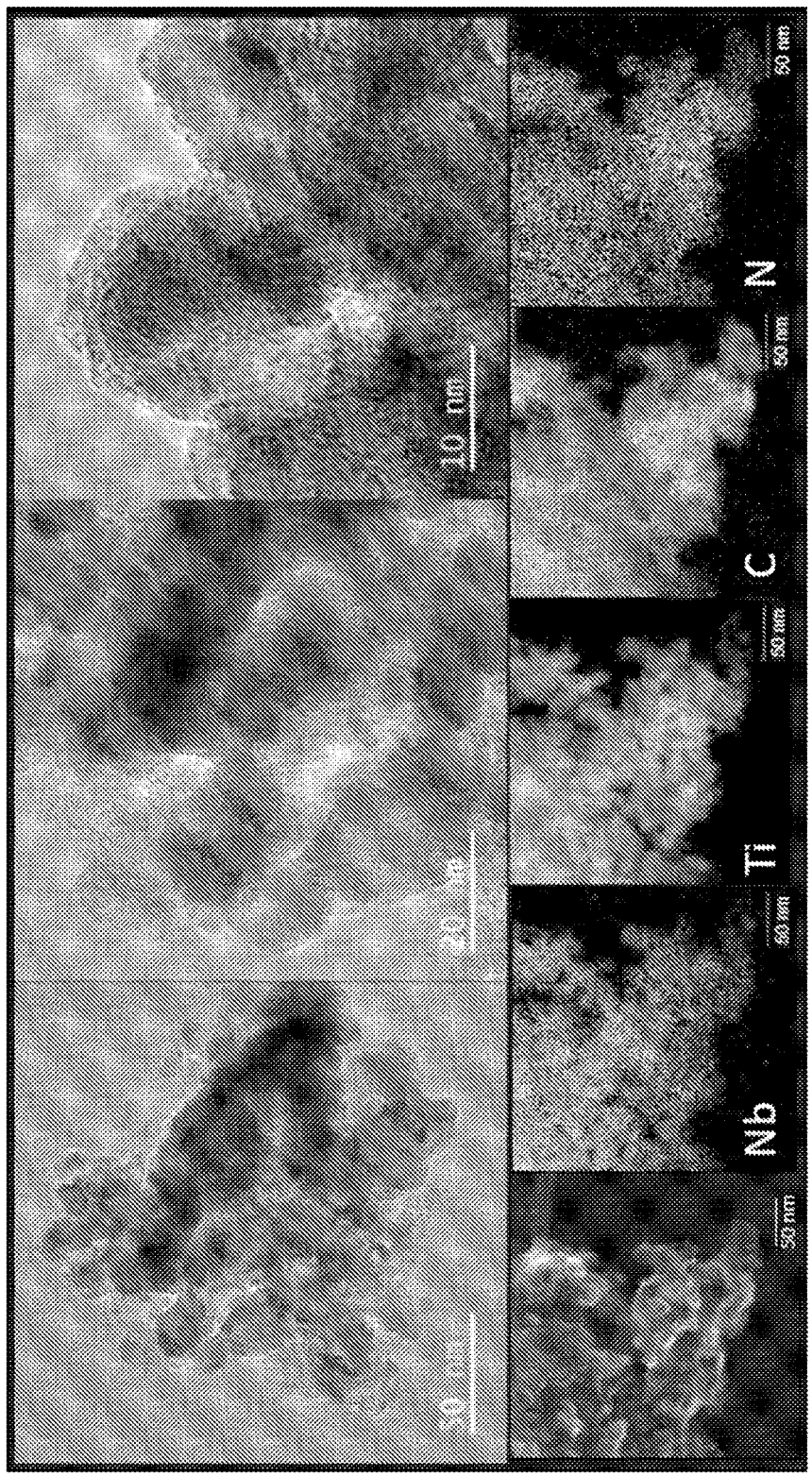
FIG. 3 shows TEM images and elemental mapping for a metal carbonitride of the invention.

FIG. 2 shows TEM images and elemental mapping of support material S1. This sample contains amorphous carbon surrounding the carbonitride material. The elemental mapping shows that niobium and titanium and nitrogen are present across the entire sample suggesting an atomically mixed sample. FIG. 3 shows material S2 TEM imaging and elemental analysis. This sample has less amorphous carbon than the S1 material, but it still has a visible layer of amorphous carbon, shown by the disorder in the TEM images. The elemental mapping shows a similar pattern to S1 material. Titanium, niobium and nitrogen are present across the material.

For TEM images and element mapping, the structure and morphology of the samples were analysed using a JEOL 2100 microscope equipped with a $LaB_6$ cathode operating at 200 kV. In the original images, which have been converted to greyscale, niobium was mapped using blue, titanium pink, carbon yellow and nitrogen green.

Powder Conductivity

Figure 4:
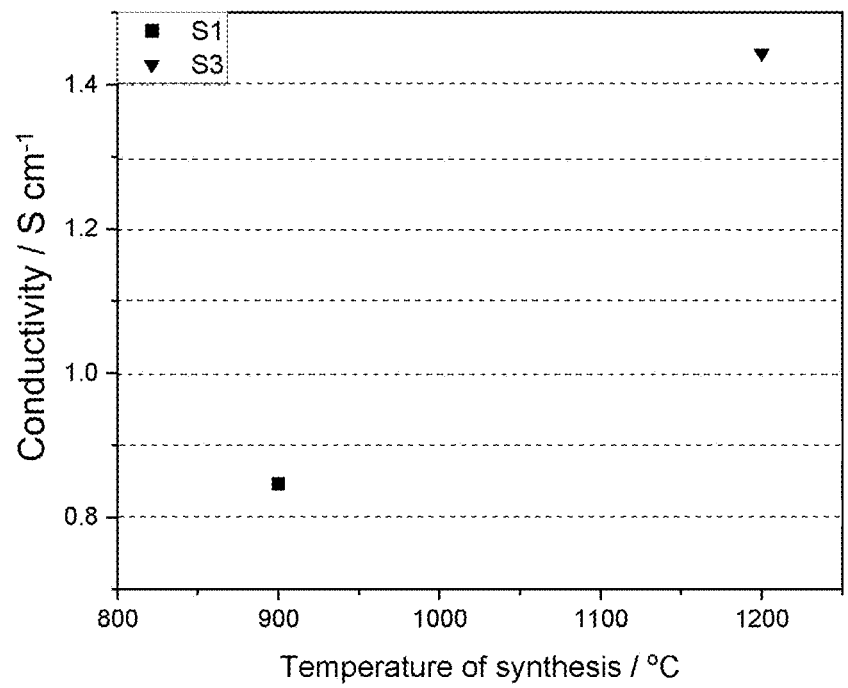
FIG. 4 shows powder conductivities measured for metal carbonitrides of the invention.

The powder conductivities of S1 and S3 are shown in FIG. 4. S1 gave conductivities of around 0.8 S $cm^{-1}$ making it suitable for use in a proton exchange membrane fuel cell or electrolyser. S3 gave a conductivity of about 1.5 S $cm^{-1}$, which is also suitable for use in a proton exchange membrane fuel cell.

To measure powder conductivity, powder samples were added to a cylinder and compressed using a piston between two gold plated electrode plates (1 $cm^2$, one on the piston and one at the bottom of the cylinder) at 2 bar pressure under inert gas. The thickness of the resulting pellets was measured and the conductivity derived from the resistivity measured from the slope of change in voltage with applied current using an Autolab potentiostat.

Stability

Acid resilience tests were performed in 1M $H_2SO_4$ at 80° C. for 24 hours in order to mimic the harsh conditions seen within a PEM fuel cell. The resulting solution was analysed by inductively coupled plasma optical emission spectroscopy (ICP-OES). Measurements were taken using a PerkinElmer 5300DV ICP-OES. Standard solutions were made using reference solutions from Fischer Chemical. Reference solutions were made of 4000, 2000, 1000, 500, 250 and 50 ppb. The calibration result was only used if the correlation coefficient was greater than 0.999. Table 2 shows that, in support materials S1, S2 and S3, some Ti ions were found in solution after the test, but the overall metal remaining in the solid was ~94% showing stability in strongly acidic conditions.

TABLE 2

| Material | % Nb remaining | % Ti remaining | % Metal remaining |
|---|---|---|---|
| S1 | 99 | 86 | 94.6 |
| S2 | 98.6 | 86 | 94.3 |
| S3 | 98.5 | 86.8 | 94.5 |

Synthesis of Electrocatalyst Layers

Electrocatalyst layers were prepared on gas diffusion layers using catalyst materials E1, E2 and E3 respectively.

0.1 g of catalyst material was combined with 0.02 g of aqueous Nafion® perfluorosulfonic acid ionomer solution (11.92 wt % solids) and 3 drops of water were added. This was then mixed in a planetary mixer for 15 seconds at 3000 rpm. The resultant ink was shear mixed in a planetary mixer using 5 mm diameter yttrium stabilised zirconia ceramic beads and a further drop of water was added if required before mixing for a further 2 minutes at 3000 rpm. The ink was stirred manually with a spatula to break up any sediment at intervals during the mixing. The resulting ink was further diluted by adding 2 g of water. The ink was then sprayed on to a 7×7 $cm^2$ square of Toray paper (hydrophobic gas diffusion layer (GDL) TGP-H-60, comprising a carbon fibre paper and PTFE) by diluting 0.25 ml of the ink, with 0.75 ml isopropanol and 1.5 ml water in the spray gun before spraying a uniform layer of material onto the Toray paper on a hot plate at 80° C. The resulting layer was weighed to get an approximation of the loading of the layer, aiming for between 0.05-0.15 mg $cm^{-2}$ of iridium, before using X-ray fluorescence (XRF) spectroscopy to analyse the uniformity of the layer loading. From the resulting catalyst layer deposited on the Toray paper, 20 mm diameter discs were cut out and further analysed by XRF.

Electrochemical Testing

The oxygen evolution reaction (OER) was used as the test reaction, hence an iridium OER electrocatalyst was used as the test electrocatalyst. Suitability in the OER is indicative of suitability in the other main electrochemical reactions in a proton exchange membrane fuel cell or electrolyser (e.g. the oxygen reduction reaction, the hydrogen evolution reaction and the hydrogen oxidation reaction). Moreover, testing specifically in the OER allows the support material to be subjected to harsher conditions than testing specifically for the other electrochemical reactions which occur during the main reactions in a proton exchange membrane fuel cell.

The catalyst material was tested for Ir mass activity in the OER. Wet cell testing was done in 0.1 M $H_2SO_4$ at 60° C. to establish the activity of the catalyst materials. The disc loaded with sample (i.e. the electrocatalyst layer prepared by the method discussed above) was wetted in 200 ml of 0.1 M $H_2SO_4$ overnight whilst under vacuum, to allow ingress of solution into the Toray paper. 5 ml of the soaking solution was taken for ICP-MS before the button was attached to a gold wire to form the working electrode. The cell was filled with 100 ml of 0.1 M $H_2SO_4$ and was degassed with nitrogen. Once the disc was in place and the cell set up, another 5 ml sample was taken for ICP-MS, before replacing the solution with fresh 0.1 M $H_2SO_4$. The counter electrode was a platinum wire and the reference electrode the RHE, consisting of hydrogen bubbled over a Pt/C catalyst. First the cell was cycled between 0-1.35 V vs RHE at different scan rates (300-5 mV/s), then an activity sweep was performed between 1-1.55 V vs RHE at 1 mV/s at the beginning of life (BOL). A sample of 5 ml was then taken for ICP-MS and replaced with fresh 0.1 M $H_2SO_4$. Then a degradation cycle between 0.6-1.35 V vs RHE at 100 mV/s for 1000 cycles was performed (~4 hours 10 minutes). This was chosen as the potential is brought up to the onset of the OER, while not forming bubbles which could affect the results. Another 5 ml sample was taken for ICP-MS analysis. An end of life (EOL) activity test was then performed after the degradation cycles in the same manner as at the start of life (cyclic voltammograms at different scan rates then an activity sweep).

Figure 5:
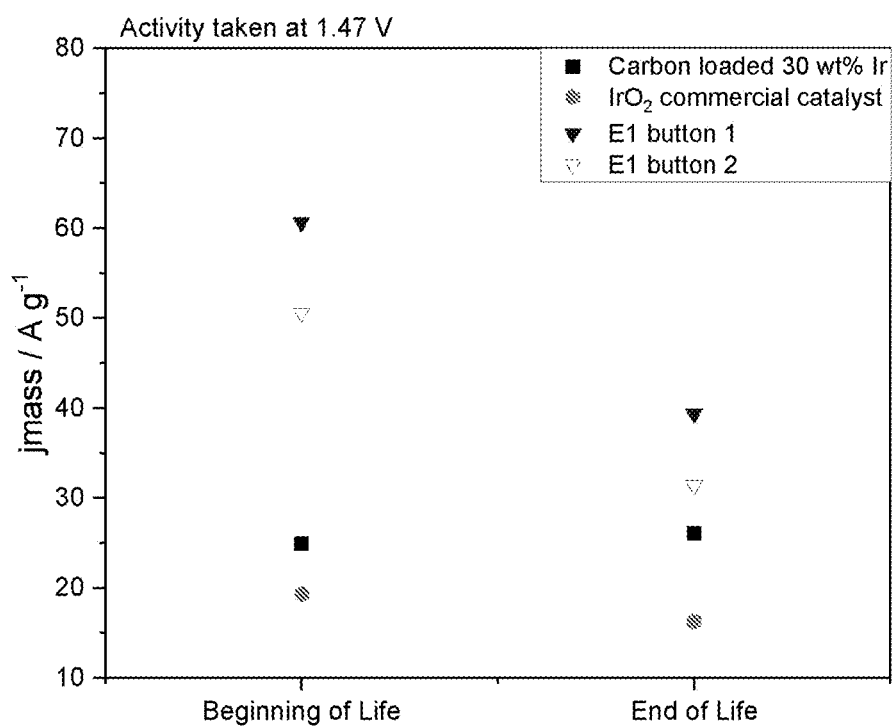
FIG. 5 shows mass activity values at 1.47 V for catalyst materials of the invention and comparative catalyst materials.

Two discs with catalyst layers containing catalyst material E1 were tested for repeatability. The activity values of E1 shown in FIG. 5 demonstrate an increase in activity over both a commercial $IrO_2$ catalyst from Alpha Aesar® and a carbon support loaded with 30 wt % iridium using the polyol method as described above for the materials of the invention. E1 shows a decrease in activity after the cycling degradation process (i.e. at EOL) but is still more active than the carbon loaded with 30 wt % iridium and the commercial $IrO_2$ at beginning of life.

REFERENCES

[1] B. M. Tackett, Y. C. Kimmel and J. G. Chen, *Int. J. Hydrogen Energy*, 2016, 41, 5948-5954.

[2] S. N. Stamatin and E. M. Skou, *ECS Trans.*, 2013, 58, 1267-1276.

[3] K. Nam, A. Ishihara, K. Matsuzawa, S. Mitsushima, K. Ota, M. Matsumoto and H. Imai, *Electrochim. Acta*, 2010, 55, 7290-7297.

[4] Y. C. Kimmel, X. Xu, W. Yu, X. Yang and J. G. Chen, *ACS Catal.*, 2014, 4, 1558-1562.

[5] Z. Cui, R. G. Burns and F. J. Disalvo, *Chem. Mater.*, 2013, 25, 3782-3784.

[6] G. Li, K. Li, L. Yang, J. Chang, R. Ma, Z. Wu, J. Ge, C. Liu and W. Xing, *ACS Appl. Mater. Interfaces*, 2018, 10, 38117-38124.

[7] B. Avasarala, T. Murray, W. Li and P. Haldar, *J. Mater. Chem.*, 2009, 19, 1803.

[8] Z. Jin, P. Li and D. Xiao, *Sci. Rep.*, 2014, 4, 1-7.

[9] F. A. O. Fontes, J. F. De Sousa, C. P. Souza, M. B. D. Bezerra, M. Benachour, J. F. De Sousa, C. P. Souza, M. B. D. Bezerra and M. Benachour, *Chem. Eng. J.*, 2011, 175, 534-538.

[10] V. L. S. T. Silva, M. Schmal, S. T. T. Oyama, V. L. S. Teixeira da Silva, M. Schmal, S. T. T. Oyama, V. L. S. T. Silva, M. Schmal and S. T. T. Oyama, *J. Solid State Chem.*, 1996, 123, 168-182.

[11] C. A. Chagas, R. Pfeifer, A. B. Rocha, V. Teixeira da Silva, V. T. Da Silva and V. Teixeira da Silva, *Top. Catal.*, 2012, 55, 910-921.

[12] S. Ramanathan, S. T. Oyama, S. Ramanathant and S. T. Oyama, *J. Phys. Chem.*, 1995, 99, 16365-16372.

The invention claimed is:

1. A catalyst material comprising an electrocatalyst supported on a catalyst support material, wherein the catalyst support material comprises a metal carbonitride comprising:
   (i) a first metal, $M^1$; and
   (ii) a second metal, $M^2$,
   wherein $M^1$ is titanium, zirconium, or hafnium, and $M^2$ is vanadium, niobium, tantalum, chromium, molybdenum, tungsten, iron, ruthenium, or osmium, and,
   wherein the metal carbonitride has a composition represented as $M^2_x M^1_{1-x} C_{1-p} N_p$, wherein x is 0.05 to 0.95 and p is 0.1 to 0.7.

2. An electrocatalyst layer comprising the catalyst material of claim 1.

3. A catalyst coated ion-conducting membrane comprising the catalyst material of claim 1.

4. A catalysed decal transfer substrate comprising the electrocatalyst layer of claim 2 and a decal transfer substrate.

5. A gas diffusion electrode comprising the electrocatalyst layer of claim 2 and a gas diffusion layer.

6. A membrane electrode assembly comprising the electrocatalyst layer of claim 2.

7. A fuel cell comprising the electrocatalyst layer of claim 2.

8. The catalyst material according to claim 1, wherein $M^1$ is titanium.

9. The catalyst material according to claim 1, wherein $M^2$ is vanadium, niobium or tantalum.

10. The catalyst material according to claim 1, wherein x is 0.05 to 0.55.

11. A catalyst material comprising an electrocatalyst supported on a catalyst support material comprising nanoparticles, wherein the nanoparticles comprise a metal carbonitride comprising:
(i) a first metal, $M^1$; and
(ii) a second metal, $M^2$,
wherein $M^1$ is titanium, zirconium, or hafnium, and $M^2$ is vanadium, niobium, tantalum, chromium, molybdenum, tungsten, iron, ruthenium, or osmium, and,
wherein the metal carbonitride has a composition represented as: $M^2_x M^1_{1-x} C_{1-p} N_p$, wherein x is 0.05 to 0.95 and p is 0.1 to 0.7.

12. The catalyst material according to claim 11, wherein x is 0.05 to 0.55.

13. The catalyst material according to claim 11, wherein $M^1$ is titanium.

14. The catalyst material according to claim 11, wherein $M^2$ is vanadium, niobium or tantalum.

\* \* \* \* \*